(12) United States Patent
Minter et al.

(10) Patent No.: US 8,579,481 B2
(45) Date of Patent: Nov. 12, 2013

(54) LIT DOOR HANDLE FOR A VEHICLE

(75) Inventors: Adam Minter, Livonia, MI (US); Michael Wlotkowski, Royal Oak, MI (US); Sadayuki Makino, Novi, MI (US); Katsuhisa Yamada, West Bloomfield, MI (US)

(73) Assignee: Aisin Technical Center of America, Inc., Plymouth, MI (US)

( * ) Notice: Subject to any disclaimer, the term of this patent is extended or adjusted under 35 U.S.C. 154(b) by 315 days.

(21) Appl. No.: 13/071,942

(22) Filed: Mar. 25, 2011

(65) Prior Publication Data
US 2012/0106182 A1 May 3, 2012

Related U.S. Application Data

(60) Provisional application No. 61/407,808, filed on Oct. 28, 2010.

(51) Int. Cl.
*B60Q 1/00* (2006.01)
*B60R 25/00* (2013.01)
*F21V 9/00* (2006.01)

(52) U.S. Cl.
USPC ............................ 362/501; 340/5.72; 362/511

(58) Field of Classification Search
USPC ................... 362/501, 511; 340/5.72
See application file for complete search history.

(56) References Cited

U.S. PATENT DOCUMENTS

| | | | |
|---|---|---|---|
| 6,577,228 B1 | 6/2003 | Tsuchida et al. | |
| 7,049,940 B2 | 5/2006 | Ieda et al. | |
| 7,537,364 B2 | 5/2009 | Misawa et al. | |
| 2003/0095416 A1 | 5/2003 | Huizenga | |
| 2006/0282987 A1 | 12/2006 | Shih et al. | |
| 2007/0086201 A1* | 4/2007 | Wang | 362/501 |
| 2007/0195542 A1 | 8/2007 | Metros et al. | |
| 2008/0290668 A1 | 11/2008 | Ieda et al. | |
| 2009/0147528 A1* | 6/2009 | Wang | 362/501 |
| 2009/0279826 A1* | 11/2009 | Ieda et al. | 385/13 |
| 2009/0284358 A1 | 11/2009 | Ieda et al. | |
| 2010/0007463 A1 | 1/2010 | Dingman et al. | |
| 2010/0117381 A1 | 5/2010 | Sung | |
| 2010/0219935 A1 | 9/2010 | Bingle et al. | |

OTHER PUBLICATIONS

International Search Report and Written Opinion issued May 30, 2012 in PCT/US11/58359 filed Oct. 28, 2011.

* cited by examiner

*Primary Examiner* — Anh Mai
*Assistant Examiner* — Michael Santonocito
(74) *Attorney, Agent, or Firm* — Oblon, Spivak, McClelland, Maier & Neustadt, L.L.P.

(57) ABSTRACT

A door handle apparatus for a vehicle is provided. The door handle includes a door handle body that is configured to be disposed at a door of the vehicle. A light source is mounted inside the door handle body. A light-transmitting member is located between the light source and the door handle body. The light-transmitting member is partially exposed to an exterior of the door handle body.

18 Claims, 6 Drawing Sheets

LIT DOOR HANDLE FOR A VEHICLE

CROSS-REFERENCE TO RELATED APPLICATIONS

This document claims priority to U.S. Provisional Application No. 61/407,808 filed Oct. 28, 2010, the entire contents of which are hereby incorporated by reference.

FIELD OF THE INVENTION

A lit door handle for a vehicle is provided. More particularly, a door handle is provided that includes a light source, such as an LED inside a door handle body of a vehicle, and a light-transmitting member, such as clear resin, positioned between the light source and the door handle body, and partially exposed to the door handle body.

BACKGROUND OF THE INVENTION

Discussion of Background

It is known to include at least one LED in a door handle. Conventional door handle lighting systems, such as those described in U.S. Patent Application Publication No. 2010/0117381, light a back side of a door handle, so as to illuminate a car body side of the door handle. Other conventional door handles, such as those described in U.S. Patent Application Publication No. 2006/0282987, include LEDs that are located on a face of the door handle.

SUMMARY OF EXEMPLARY ASPECTS OF THE ADVANCEMENTS

In one aspect, a door handle apparatus for a vehicle is provided. The door handle includes a door handle body that is configured to be disposed at a door of the vehicle. A light source is mounted inside the door handle body. A light-transmitting member is located between the light source and the door handle body. The light-transmitting member is partially exposed to an exterior of the door handle body.

A door handle for a vehicle that includes an intelligent lighting system that provides continuous lighting is provided. The door handle includes a door handle body. The door handle body includes a first body member and a second body member. The first body member and a second body member are assembled together so as to define an interior space within the door handle. A light source is disposed within the interior space of the door handle body. At least one light transmission member extends from the interior space of the door handle to an exterior surface of the door handle body so as to provide a continuous band of light along each of an upper and lower surface of the door handle.

In another aspect, a method for providing door lock status information via an intelligent lighting system that provides continuous lighting from a door handle is provided. The method includes transmitting a first light signal having a first color from a door handle when a user approaches a vehicle and comes within a predetermined area such that a key fob carried by the vehicle owner is detected by a smart antenna in the handle. When the user touches a smart sensor, a second light signal having a second color is transmitted from the door handle and all of the vehicle doors are unlocked. If the user does not get into the vehicle after a predetermined period of time, a third light signal having a third color is transmitted from the door handle and all of the doors are locked.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Various kinds of key-less entry systems exist in the market. Some keyless entry systems require activation (such as by pushing a button) by a user in order to unlock a door lock. Other types are able to unlock a door lock without an activation by a user since a wireless key detector ("key fob") recognizes an approaching user with the key fob within a predetermined area.

A smart entry system, as referred to herein may be one of the key-less entry system which has a wireless key fob detector, a touch sensor, a user hand or grip detector and so on. The concept of this present disclosure can be applied to all kinds of key-less entry systems including smart entry system for vehicles.

I. Hardware.

Figure 1A:
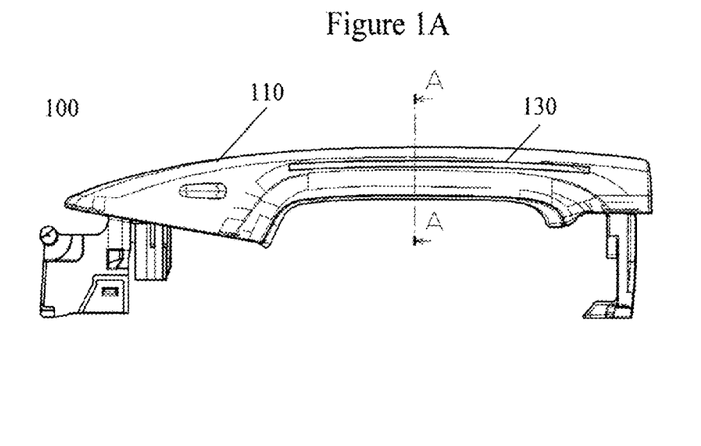
FIGS. 1A-1C illustrate various views of a door handle in accordance with an exemplary aspect of the disclosure.
Figure 1B:
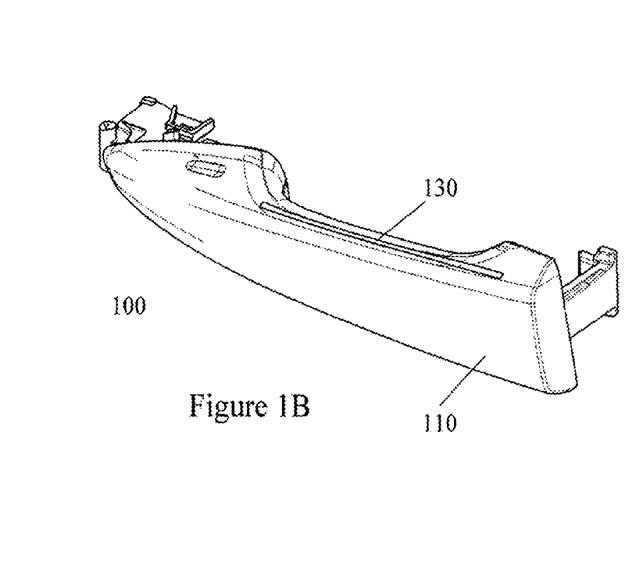
Figure 1C:
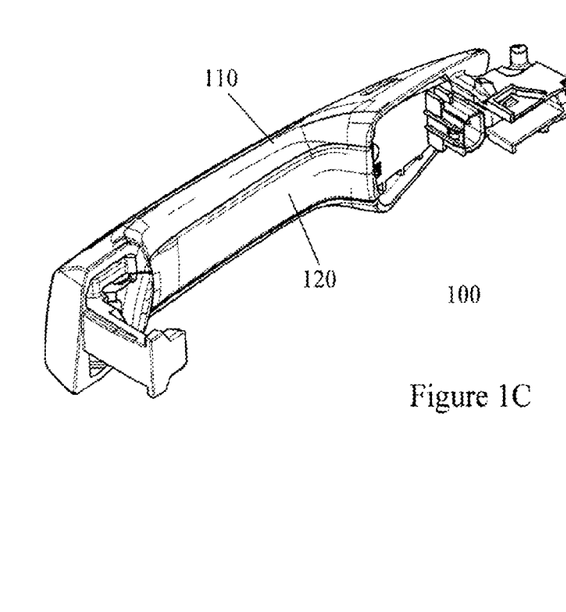

FIGS. 1A-1C illustrate various views of a door handle in accordance with an exemplary aspect of the disclosure. In particular, a door handle 100 includes a first body member 110, which faces away from a vehicle body, and a second body member 120, which faces a vehicle body. The second body member 120 can also be understood as being located on the "working" side of the door handle, as the second body member 120 is typically grasped by a vehicle passenger to actuate the handle.

Figure 2A:
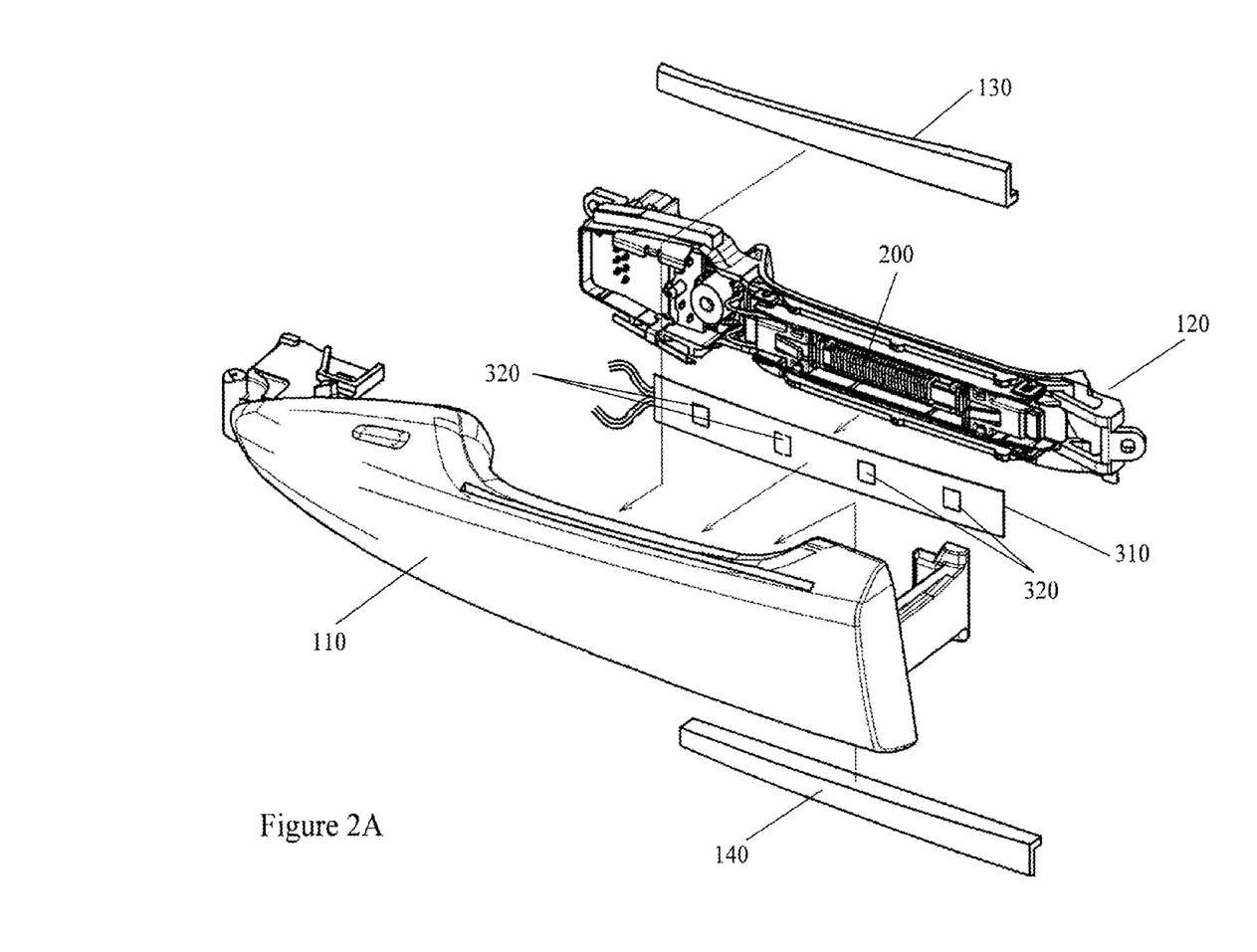
FIGS. 2A and 2B illustrate exploded views the door handle in accordance with an exemplary aspect of the disclosure.
Figure 2B:
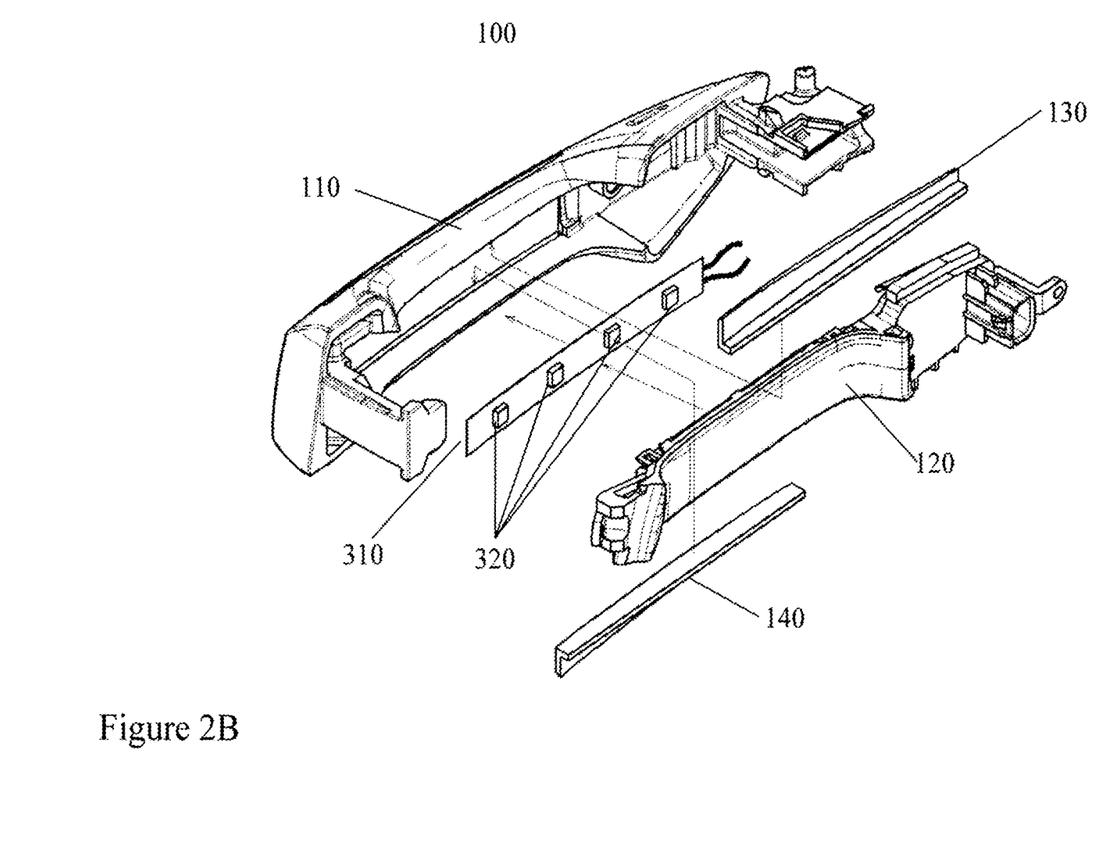

FIGS. 2A and 2B illustrate exploded views the door handle in accordance with an exemplary aspect of the disclosure. As shown in FIGS. 2A and 2B, the door handle 100 includes a smart antenna 200, which is used as part of a smart entry system. The door handle 100 further includes an LED board 310 that includes a plurality of LEDs 320. The LEDs may all transmit the same color, or each may transmit different colors from each other. The light emitted from the LEDs 320 is transmitted through the top and bottom surfaces the first body member 110 via the transmission elements 130 and 140. The transmission elements 130 and 140 can be clear resin elements that are made of, for example, acrylic or polycarbonate. As shown in FIGS. 2A and 2B, the transmission elements 130 and 140 are each long, continuous members that extend lengthwise along the door handle 100. Thus, unlike a configuration in which single LEDs are provided to provide single points of light, the transmission elements 130 and 140 are able to provide an uninterrupted, continuous band of light along the length of both the upper and lower portions of the door handle 100.

Figure 3A:
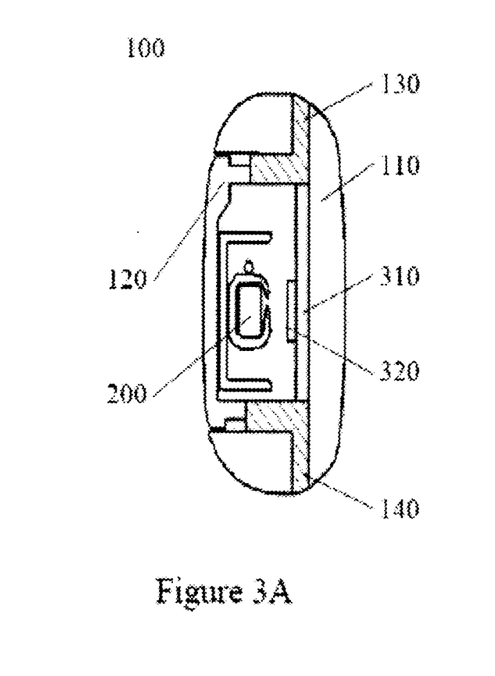
FIG. 3A illustrates a side cut-away view of the door handle in accordance with an exemplary aspect of the disclosure
Figure 3B:
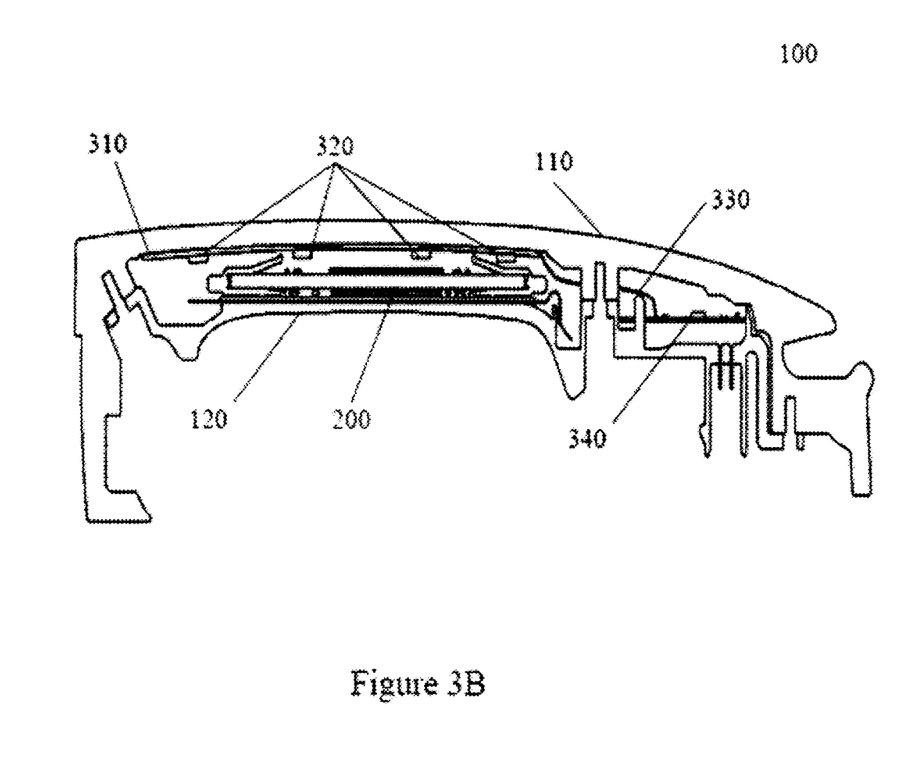
FIG. 3B illustrates a top cut-away view of a door handle in accordance with an exemplary aspect of the disclosure.

FIG. 3A illustrates a side cut-away view of the door handle 100, and FIG. 3B illustrates a top cut-away view of the door handle 100. As shown in FIG. 3B, the door handle 110 is able to accommodate a wire harness 330 and an electronic circuit board 340. As discussed in greater detail below, the inclusion of the wire harness 330 and the electronic circuit board 340 in a single package with the smart antenna 200 allows the door handle to perform various lighting operations.

FIGS. 4A-4F illustrate cross sectional views along a cross-section of the door handle in accordance with several exemplary aspects of the disclosure. The door handles illustrated in FIGS. 4A-4F are designed such that the first and second transmission elements and the first and second body members of the door handle can be assembled in a watertight manner without any gaps.

Figure 4A:
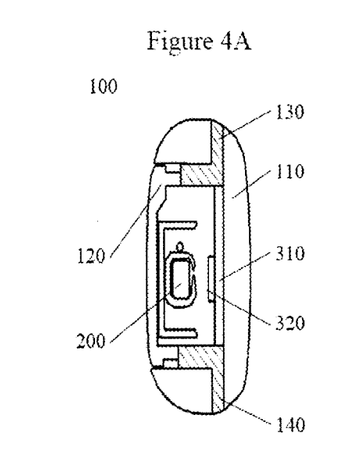
FIGS. 4A-4F illustrate cross sectional views along a cross-section of the door handle in accordance with several exemplary aspects of the disclosure.

FIG. 4A shows a cross-sectional view of the door handle 100 taken along the line A-A in FIG. 1A. The transmission element 130 is exposed to a top surface of the door handle 100, and the transmission element 140 is exposed to a bottom surface of the door handle 140. Each of the transmission elements 130 and 140 are in direct contact with both the first body member 110 and the second body member 120. As shown in FIG. 4A, the LED board 310 acts as a locater that locates the transmission elements 130 and 140 within the door handle 100. In particular, the transmission member 130 is pushed up into place within the first body member 110 by a top portion of the LED board 310. Likewise, the transmission member 140 is pushed down into the first body member 110 by a bottom portion of the LED board 310. In this manner, the LED Board 310 causes the transmission elements 130 and 140 as well as the first and second body members 110 and 120 to fit together in a snug fashion without gaps. Thus, in this example, the LED Board 130 has the dual functions of supporting the LEDs 320 and also locating the transmission members 130 and 140 in the door handle 100.

Figure 4B:
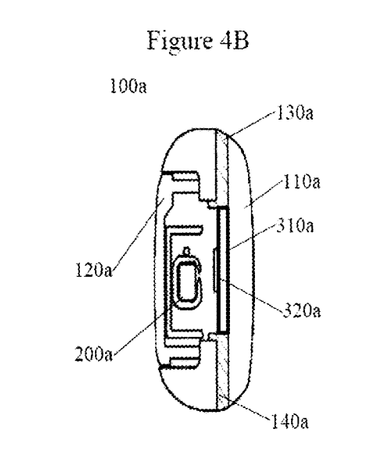

FIG. 4B shows a cross-section of a door handle 100*a* that includes a first body member 110*a*, a second body member 120*a*, a smart antenna 200*a*, an LED board 310*a*, at least one LED 320*a*, a transmission element 130*a* and a transmission element 140*a*. The embodiment in FIG. 4B differs from the embodiment in FIG. 4A in that the transmission elements 130*a* and 140*a* do not make direct contact with the second body member 120*a*. In this configuration, the location of the transmission elements 130*a* and 140*a* is handled by the location and size of the LED board 310*a*, and is not affected by the location of the second body member 120*a*. Therefore, existing manufacturing techniques, which do not incorporate the transmission elements 130*a* and 140*a*, can be used so as to locate the first and second body members 110 and 120 relative to each other in a gap-free manner. In other words, the incorporation of the transmission elements 130*a* and 140*a* does not become a source of error in the manufacturing process with respect to the location of the first and second body members 110 and 120. Thus, the number of parts that must be manufactured with tight tolerances can be reduced. As a result, it is easier to control the overall tolerances during manufacture of the 100*a*, which can reduce the appearance of a gap between the first body member 110*a* and the second body member 120*a*.

Figure 4C:
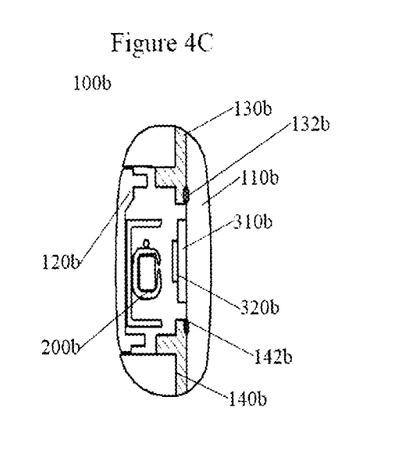

FIG. 4C shows a cross-section of a door handle 100*b* that includes a first body member 110*b*, a second body member 120*b*, a smart antenna 200*b*, an LED board 310*b*, at least one LED 320*b*, a transmission element 130*b* and a transmission element 140*b*. The embodiment in FIG. 4C differs from the previous embodiments in that the transmission elements 130*b* and 140*b* are secured to the first body member 110*b* by ultrasonic welding at locations 132*b* and 142*b*. This configuration further reduces the need for tight tolerances in manufacturing, as neither of the second body member or the LED board 310*b* are used to locate the transmission elements 130*b* and 140*b*.

Figure 4D:
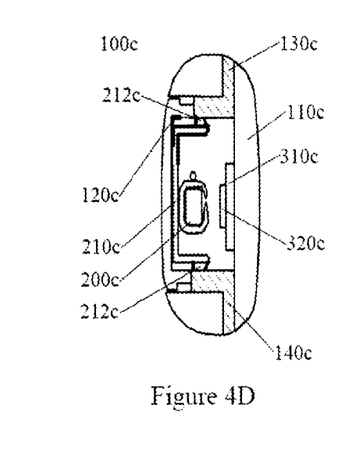

FIG. 4D shows a cross-section of a door handle 100*c* that includes a first body member 110*c*, a second body member 120*c*, a smart antenna 200*c*, an LED board 310*c*, at least one LED 320*c*, a transmission element 130*c* and a transmission element 140*c*. The embodiment in FIG. 4D differs from the previous embodiments in that the transmission elements 130*b* and 140*b* are secured to each of the first body member 110*c*, the second body member 120*c*, and the a circuit board 210*c* of the smart antenna 200*c*, but are not in direct contact with the LED board 310*c*. In particular, the circuit board 210*c* includes stops 212*c* that locate the transmission elements 130*b* and 140*b* within the door handle 100*c*. This configuration allows for more flexibility in the placement of the LED board 310*c* within the door handle 100*c*.

Figure 4E:
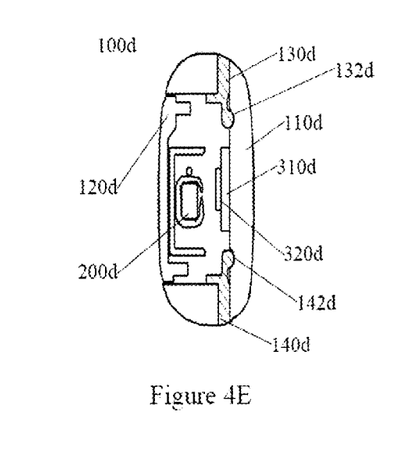

FIG. 4E shows a cross-section of a door handle 100*d* that includes a first body member 110*d*, a second body member 120*d*, a smart antenna 200*d*, an LED board 310*d*, at least one LED 320*d*, a transmission element 130*d* and a transmission element 140*d*. The embodiment in FIG. 4E differs from the previous embodiments in that the transmission elements 130*d* and 140*d* are secured to the first body member 110*d* by snap-fit at locations 132*d* and 142*d*. This configuration further reduces the need for tight tolerances in manufacturing, as neither of the second body member 102*d* or the LED board 310*d* are used to locate the transmission elements 130*d* and 140*d*.

Figure 4F:
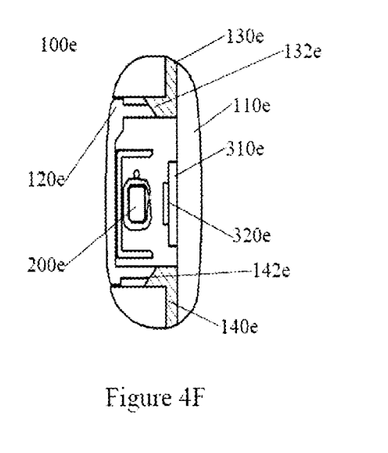

FIG. 4F shows a cross-section of a door handle 100*e* that includes a first body member 110*e*, a second body member 120*e*, a smart antenna 200*e*, an LED board 310*e*, at least one LED 320*e*, a transmission element 130*e* and a transmission element 140*e*. The embodiment in FIG. 4F differs from the previous embodiments in that the transmission elements 130*e* and 140*e* are secured to the second body member 120*e* by a slant stopper at locations 132*e* and 142*e*. The slant angle of the slant stoppers creates stabilizing forces in both two directions, and thereby reduces the need for tight tolerances in manufacturing, as the LED board 310*e* is not used to locate the transmission elements 130*e* and 140*e*.

Figure 5A:
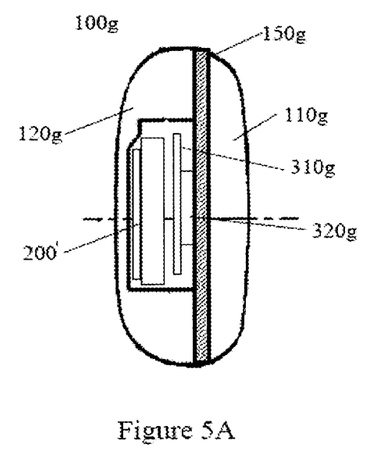
FIGS. 5A-5D illustrate cross sectional views along the cross-section of the door handle in accordance with several further exemplary aspects of the disclosure.

FIGS. 5A-5D illustrate cross sectional views of further embodiments of the present disclosure. The examples shown in FIGS. 5A-5D include waterproof configurations, in which the smart antenna 200 is encased in a cover so as to become a waterproof antenna assembly 200'. Likewise, the LEDs and LED boards depicted in FIGS. 5A-5D are configured to be waterproof in a manner that will be readily apparent to those having skill in the art. FIG. 5A shows a cross-section of a door handle 100*g* that includes a first body member 110*g*, a second body member 120*g*, a waterproof smart antenna assembly 200', an LED board 310*g*, at least one LED 320*g*, and a single transmission element 150*g*. The embodiment in FIG. 5A differs from the previous embodiments in that plural transmission elements are replaced by a single transmission element 150*g* that is sandwiched between the first body member 110*g* and the second body member 120*g*.

Figure 5B:
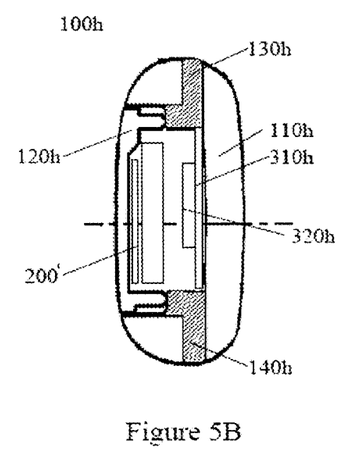

FIG. 5B shows a cross-section of a door handle 100*h* that includes a first body member 110*h*, a second body member 120*h*, a waterproof smart antenna assembly 200', an LED board 310*h*, at least one LED 320*h*, a transmission element 130*h* and a transmission element 140*h*. The example in FIG. 5B is the same as that shown in FIG. 4A, with the exception that the smart antenna 200 is replaced with a waterproof smart antenna assembly 200'. In particular, the LED Board 310h has the dual functions of supporting the LEDs 320h and also locating the transmission members 130h and 140h in the door handle 100h.

Figure 5C:
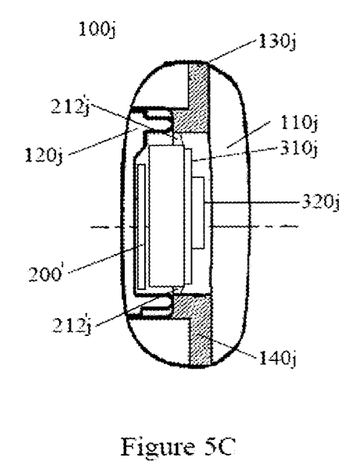

FIG. 5C shows a cross-section of a door handle 100j that includes a first body member 110j, a second body member 120j, a smart antenna 200, an LED board 310j, at least one LED 320j, a transmission element 130j and a transmission element 140j. The embodiment in FIG. 5C differs from the previous embodiments in that the LED board 10j and the LED 320j are integrated with the waterproof smart antenna assembly 200'. In this example, the waterproof smart antenna assembly 200' includes stops 212'j that locate the transmission elements 130j and 140j within the door handle 100j.

Figure 5D:
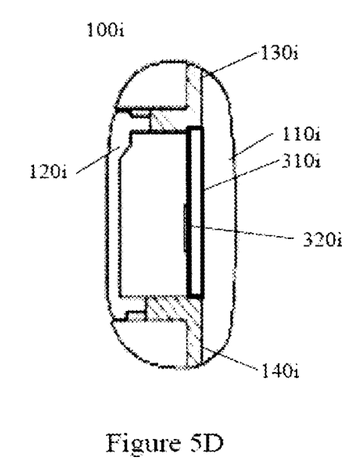

FIG. 5D shows a cross-section of a door handle 100i that includes a first body member 110i, a second body member 120i, an LED board 310i, at least one LED 320i, a transmission element 130i and a transmission element 140i. The embodiment in FIG. 5D differs from the previous embodiments in that the door handle 100i does not include a smart antenna 200.

II. System Operation.

As noted above, the door handle described herein can include LEDs that transmit several different colors. This configuration allows a vehicle passenger to gain valuable information as they approach a vehicle with a key fob that communicates with a smart antenna 200. For example a door handle can show a welcome status with a white light, a lock status with a red light, and unlock status with a green light. When all of the doors include the handles disclosed herein passengers easily understand which door is locked or unlocked.

Basically, lighting control is achieved based on a "smart entry system" such as lighting duration. For example, in an initial state, there is no lighting. As a vehicle owner approaches a vehicle, and comes within a predetermined area such that a key fob carried by the vehicle owner is detected by a smart antenna in the handle, a white light is transmitted from the handle. Once the vehicle owner touches a smart sensor, all of the vehicle doors unlock, and the handle lights up green. Once the vehicle owner and the vehicle passengers get into the vehicle, the handle lighting turns off.

In another example, as a vehicle owner approaches a vehicle, and comes within a predetermined area such that a key fob carried by the vehicle owner is detected by a smart antenna in the handle, a white light is transmitted from the handle. Once the vehicle owner touches a smart sensor, all of the vehicle doors unlock, and the handle lights up green. In this example, if the owner does not get into the vehicle after a predetermined period of time, all of the doors lock, and the vehicle handle lights red.

In another example, when the vehicle owner exits the vehicle, the vehicle handle lights up white. Once all of the doors are locked, the door handle lights up red. When the vehicle owner passes a predetermined distance away from the vehicle, such that the smart antenna no longer detects a key fob carried by the vehicle owner, the handle light turns off.

In another example, in an initial state, there is no lighting. As a vehicle owner approaches a vehicle, and comes within a predetermined area such that a key fob carried by the vehicle owner is detected by a smart antenna in the handle, a white light is transmitted from the handle. Once the vehicle owner touches a smart sensor, all of the vehicle doors unlock, and the handle lights up green. After a predetermined period of time (i.e. five seconds) the handle light turns white. Once the vehicle owner and the vehicle passengers get into the vehicle, the handle lighting turns off.

In another example, in an initial state, there is no lighting. As a vehicle owner approaches a vehicle, and comes within a predetermined area such that a key fob carried by the vehicle owner is detected by a smart antenna in the handle, a white light is transmitted from the handle. Once the vehicle owner touches a smart sensor, only the driver's door is unlocked, the driver's handle lights up green, and all of the other vehicle doors light up with a white light. Once the vehicle owner gets into the vehicle, the handle lighting turns off.

Obviously, numerous modifications and variations of the present invention are possible in light of the above teachings. It is therefore to be understood that within the scope of the appended claims, the invention may be practiced otherwise than as specifically described herein.

The invention claimed is:

1. A door handle apparatus for a vehicle comprising:
   a door handle body that is configured to be disposed at a door of the vehicle;
   a light source mounted inside the door handle body;
   a first light-transmitting member and a second light-transmitting member separate from the first light transmitting member, each located between the light source and the door handle body,
   wherein the first and second light-transmitting members are partially exposed to an exterior of the door handle body, and
   wherein the first light-transmitting member extends from the light source in a first direction and the second light-transmitting member extends from the light source in a second direction which is opposite to the first direction.

2. The door handle apparatus according to claim 1, further comprising an electronic circuit board that communicates with a smart antenna,
   wherein, the light source is configured separately from the electronic circuit board.

3. The door handle apparatus according to claim 1, further comprising an electronic circuit board that communicates with a smart antenna,
   wherein, the light source and the electronic circuit board is configured in an integrated manner.

4. The door handle apparatus according to claim 1, wherein the light source is sandwiched between the door handle body for fixing.

5. The door handle apparatus according to claim 1, wherein the light source is configured without an electronic circuit board that communicates with a smart antenna.

6. The door handle apparatus according to claim 1, wherein the light source is mounted to at least one of the first and second light-transmitting members by a stopper.

7. The door handle apparatus according to claim 1, wherein at least one of the first and second light-transmitting members is mounted to the door handle body by an ultrasonic welding.

8. The door handle apparatus according to claim 1, wherein at least one of the first and second light-transmitting members is mounted to the door handle body by a snap-fit fixation.

9. The door handle apparatus according to claim 1, wherein at least one of the first and second light-transmitting members is mounted to the door handle body by a slant stopper.

10. A door handle for a vehicle that includes an intelligent lighting system that provides continuous lighting, the door handle comprising:
    a door handle body, the door handle body including a first body member and a second body member, the first body member and a second body member being assembled together so as to define an interior space within the door handle;

a light source disposed within the interior space of the door handle body;

a first transmission element that extends from the interior space of the door handle to an exterior surface of the door handle body in a first direction; and a second transmission element that extends from the interior space of the door handle to the exterior surface of the door handle body in a second direction opposite to that of the first direction, the second transmission element being separate from the first transmission element.

11. The door handle according to claim 10, wherein the first transmission element extends from the interior space of the door handle to a top exterior surface of the door handle body so as to provide a continuous band of light along an upper surface of the door handle, and the second transmission element extends from the interior space of the door handle to a bottom exterior surface of the door handle body so as to provide a continuous band of light along a lower surface of the door handle.

12. The door handle according to claim 11, further comprising a light source circuit board that supports the light source,
wherein the light source circuit board is positioned within the interior space of the door handle so as to make direct contact with the first and second transmission elements and thereby locate the first and second transmission elements within the first body member.

13. The door handle according to claim 12, wherein each of the first and second transmission elements are in direct contact with each of the first and second body members.

14. The door handle according to claim 12, wherein each of the first and second transmission elements are in direct contact with the first body member, and each of the first and second transmission elements are not in direct contact with the second body member.

15. The door handle according to claim 11, further comprising:

a light source circuit board that supports the light source; and an electronic circuit board that communicates with a smart antenna, the light source circuit board including stoppers that make direct contact with the first and second transmission elements so as to locate the first and second transmission elements within the first body member.

16. The door handle apparatus according to claim 10, wherein the light-transmitting member is mounted to the first body member by an ultrasonic welding.

17. The door handle apparatus according to claim 10, wherein the light-transmitting member is mounted to the first body member by a snap-fit fixation.

18. The door handle apparatus according to claim 10, wherein the light-transmitting member is mounted to the second body member by a slant stopper.

* * * * *